United States Patent
Kurata et al.

(10) Patent No.: US 6,448,342 B2
(45) Date of Patent: Sep. 10, 2002

(54) TRANSPARENT BUTADIENE-BASED RUBBER-REINFORCED RESIN AND COMPOSITION CONTAINING THE SAME

(75) Inventors: Takashi Kurata; Shinobu Fukumura; Yoshio Nakanishi; Junichirou Nitta, all of Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 09/836,551

(22) Filed: Apr. 18, 2001

(30) Foreign Application Priority Data

Apr. 21, 2000 (JP) ......................................... 2000/121380

(51) Int. Cl.$^7$ .......................... C08F 36/06; C08F 255/08

(52) U.S. Cl. ......................... 525/243; 525/310; 525/316

(58) Field of Search ................................ 525/243, 310, 525/316

(56) References Cited

U.S. PATENT DOCUMENTS 4,351,923 A * 9/1982 Tokas .......................... 525/310

* cited by examiner

Primary Examiner—James J. Seidleck
Assistant Examiner—Olga Asinovsky
(74) Attorney, Agent, or Firm—Nixon & Vanderhye P.C.

(57) ABSTRACT

The present invention relates to a transparent butadiene-based rubber-reinforced resin produced by graft-polymerizing monomer components (b) comprising as main components an aromatic vinyl compound, a vinyl cyanide compound and an acrylic or methacrylic acid ester in the presence of particles of a butadiene-based rubber (a), said butadiene-based rubber-reinforced resin comprising, when observed by an electron microscope, a rubber phase having an average particle size of 150 to 350 nm and containing particles having a particle size of less than 150 nm in an amount of not more than 30% by weight and particles having a particle size of more than 350 nm in an amount of not more than 30% by weight; and containing acetone solubles having an intrinsic viscosity [η] of 0.2 to 0.4 dl/g when measured at 30° C. in methyl ethyl ketone.

13 Claims, No Drawings

TRANSPARENT BUTADIENE-BASED RUBBER-REINFORCED RESIN AND COMPOSITION CONTAINING THE SAME

BACKGROUND OF THE INVENTION

The present invention relates to a transparent butadiene-based rubber-reinforced resin and a composition containing the same, and more particularly, to a butadiene-based rubber-reinforced resin which exhibits an excellent transparency and contains a rubber phase having specific average particle size and particle size distribution, and a butadiene-based rubber-reinforced resin composition for laser marking having an excellent white tinting property.

In recent years, transparent materials have been increasingly demanded in application fields such as light electric devices or electronic devices, especially audio-related devices or office automation (OA) devices. The transparent materials used in such applications have been required to have not only transparency but also mechanical strength such as impact resistance. Styrene-based resins obtained by polymerizing or copolymerizing an aromatic vinyl compound are brittle, i.e., are deteriorated in mechanical strength nevertheless excellent transparency thereof. In order to enhance the mechanical strength, it has been attempted to blend rubber polymers with the styrene-based resins to prepare rubber-reinforced resins. However, molded products obtained from such resins are opaque and fail to exhibit a sufficient impact resistance.

The deteriorated transparency of the rubber-reinforced resins obtained by blending rubber polymers with the styrene resins is caused by the difference in refractive index therebetween. Therefore, in order to obtain rubber-reinforced resins having a high transparency, it is required that the refractive index of the rubber component as domain is identical to that of the resin component as matrix. For example, when a butadiene-based rubber having an excellent reinforcing property but a low refractive index is used as the rubber component, it is required to use polymethyl methacrylate (PMMA) having a low refractive index as the resin component. However, since the PPMA itself has a poor mechanical strength, the obtained rubber-reinforced PMMA is still insufficient in rubber-reinforcing effect, and fails to show a satisfactory mechanical strength.

As rubber-reinforced resins which are improved in mechanical strength, there have be marketed so-called transparent ABS resins using as the resin component, methyl mechacrylate/styrene/acrylonitrile (MMA/ST/AN) tercopolymer having a refractive index close to that of the butadiene-based rubber. However, the conventional transparent ABS resins are insufficient in transparency, and show ill-balanced mechanical properties. Further, as conventionally known, these transparent ABS resins fail to exhibit a white tinting property by laser marking.

As a result of the present inventors' earnest studies to solve the above problem, it has been found that when the rubber phase as domain has specific average particle size and particle size distribution, the obtained butadiene-based rubber-reinforced resin and its composition can show an enhanced transparency and are free from the above disadvantages.

The present invention has been attained based on the above finding.

SUMMARY OF THE INVENTION

An object of the present invention is to provide a transparent butadiene-based rubber-reinforced resin and its composition which are free from the problems of the conventional styrene-based resins, and can exhibit excellent mechanical properties and high laser marking property in addition to inherent transparency and moldability of the styrene-based resins.

To accomplish the aim, in a first aspect of the present invention, there is provided a transparent butadiene-based rubber-reinforced resin produced by graft-polymerizing monomer components (b) comprising as main components an aromatic vinyl compound, a vinyl cyanide compound and an acrylic or methacrylic acid ester in the presence of particles of a butadiene-based rubber (a), said butadiene-based rubber-reinforced resin comprising, when observed by an electron microscope, a rubber phase having an average particle size of 150 to 350 nm and containing particles having a particle size of less than 150 nm in an amount of not more than 30% by weight and particles having a particle size of more than 350 nm in an amount of not more than 30% by weight; and containing acetone solubles having an intrinsic viscosity [η] of 0.2 to 0.4 dl/g when measured at 30° C. in methyl ethyl ketone.

In a second aspect of the present invention, there is provided a transparent butadiene-based rubber-reinforced resin produced by graft-polymerizing monomer components (b) comprising as main components an aromatic vinyl compound, a vinyl cyanide compound and an acrylic or methacrylic acid ester in the presence of particles of a butadiene-based rubber (a) having an average particle size of 150 to 350 nm and containing particles having a particle size of less than 150 nm in an amount of not more than 30% by weight and particles having a particle size of more than 350 nm in an amount of not more than 30% by weight, said butadiene-based rubber-reinforced resin containing acetone solubles having an intrinsic viscosity [η] of 0.2 to 0.4 dl/g when measured at 30° C. in methyl ethyl ketone.

In a third aspect of the present invention, there is provided a transparent butadiene-based rubber-reinforced resin composition, comprising:

the transparent butadiene-based rubber-reinforced resin (A) as defined in the first or second aspect; and a thermoplastic resin made of a copolymer (B) which is produced by copolymerizing an aromatic vinyl compound, a vinyl cyanide compound and an acrylic or a methacrylic acid ester, and has an intrinsic viscosity [η] of 0.2 to 0.4 dl/g when measured at 30° C. in methyl ethyl ketone, said transparent butadiene-based rubber-reinforced resin being contained in an amount of 3 to 30% by weight based on the total weight of the composition.

In a fourth aspect of the present invention, there is provided a butadiene-based rubber-reinforced resin composition for laser marking, comprising:

30 to 100 parts by weight of the transparent butadiene-based rubber-reinforced resin (A) according to the first and second aspect; and 70 to 0 parts by weight of a thermoplastic resin other than said the transparent butadiene-based rubber-reinforced resin (A), with the proviso that the total amount of (A) and (C) is 100% by weight.

DETAILED DESCRIPTION OF THE INVENTION

The present invention will now be described in detail below.

Examples of the butadiene-based rubbers used in the present invention may include polybutadiene, styrene-butadiene random copolymers, styrene-butadiene block copolymers, styrene-butadiene-styrene block copolymers, block copolymers composed of polystyrene blocks and styrene-butadiene random copolymer blocks, styrene-2,3-dimethylbutadine random copolymers, styrene-2,3-dimethylbutadine block copolymers, styrene-2,3-dimethylbutadine-styrene block copolymers, butadiene-acrylonitrile random copolymers, butadiene-acrylonitrile block copolymers, hydrogenated products of polybutadiene and the above-described copolymers, or the like. By hydrogenating these butadiene-based rubbers, 1,4-butadiene units contained in the original copolymers before hydrogenation are converted into ethylene units, and 1,2-butadiene units thereof are converted into butene-1 units. For example, the hydrogenated styrene-butadiene-styrene block copolymers may include styrene-(ethylene/butene-1)-styrene (SEBS) block copolymers wherein the (ethylene/butene-1) blocks represent ethylene-butene-1 random copolymer blocks. Among the above butadiene-based rubbers, polybutadiene, styrene-butadiene random copolymers, styrene-butadiene block copolymers and styrene-butadiene-styrene block copolymers are preferred, and polybutadiene is especially preferred. These butadiene-based rubbers may be used singly or in the form of a mixture of any two or more thereof.

The butadiene-based rubber preferably has a gel fraction of not less than 80% by weight, more preferably not less than 85% by weight, especially preferably not less than 90% by weight. When the gel fraction of the butadiene-based rubber is too small, the obtained butadiene-based rubber-reinforced resin and its composition tend to become insufficient in impact resistance and transparency.

Here, the gel fraction is determined as follows. That is, one gram of the butadiene-based rubber is added to 100 ml of toluene. The resultant mixture is allowed to stand at room temperature for 48 hours, and then filtered through 100-mesh screen. The filtrate in which toluene solubles are dissolved or dispersed, is distilled to remove toluene therefrom. The obtained solids are dried and weighed to calculate the gel fraction according to the following formula:

Gel fraction (%)=[1(g)−toluene solubles (g)]×100

The gel fraction of the butadiene-based rubber may be controlled by appropriately selecting kind and amount of molecular weight modifier, and polymerization conditions such as polymerization time, polymerization temperature and final polymerization conversion percentage, upon the production of the butadiene-based rubber.

In the graft polymerization of the present invention, the butadiene-based rubber is used in the form of particles. In the transparent butadiene-based rubber-reinforced resin according to the second aspect of the present invention, the butadiene-based rubber particles are required to have the following average particles size and particle size distribution. That is, the average particle size of the butadiene-based rubber particles is 150 to 350 nm, preferably 170 to 320 nm, more preferably 200 to 300 nm. The particle size distribution of the butadiene-based rubber particles is so adjusted that the content of particles having a particle size of less than 150 nm is not more than 30% by weight, preferably not more than 25% by weight, more preferably not more than 20% by weight, and the content of particles having a particle size of more than 350 nm is not more than 30% by weight, preferably not more than 25% by weight, more preferably not more than 20% by weight.

In the transparent butadiene-based rubber-reinforced resin according to the first aspect of the present invention, when observed by an electron microscope, the rubber phase thereof is required to have an average particle size of 150 to 350 nm, and have such a particle size distribution that the content of particles having a particle size of less than 150 nm is not more than 30% by weight, and the content of particles having a particle size of more than 350 nm is not more than 30% by weight. By limiting the average particle size and the particle size distribution of the butadiene-based rubber particles to the above-specified ranges, those of the rubber phase of the obtained rubber-reinforced resin (A) can also be adjusted to the above specified ranges. As a result, it is possible to obtain the rubber-reinforced resin (A) exhibiting excellent transparency and mechanical properties.

In the transparent butadiene-based rubber-reinforced resin according to the second aspect of the present invention, when the average particle size of the butadiene-based rubber particles is less than 150 nm, the obtained rubber-reinforced resin and its composition tend to be deteriorated in impact resistance, and when the average particle size thereof is more than 350 nm, the obtained rubber-reinforced resin and its composition tend to be deteriorated in transparency. Also, when the content of particles having a particle size of less than 150 nm is more than 30% by weight, the obtained rubber-reinforced resin and its composition tend to be deteriorated in impact resistance, and when the content of particles having a particle size of more than 350 nm is more than 30% by weight, the obtained rubber-reinforced resin and its composition tend to be deteriorated in transparency.

In the transparent butadiene-based rubber-reinforced resin according to the first aspect of the present invention as observed by an electron microscope, when the average particle size of the rubber phase is less than 150 nm, the obtained rubber-reinforced resin and its composition tend to be deteriorated in impact resistance, and when the average particle size of the rubber phase is more than 350 nm, the obtained rubber-reinforced resin and its composition tend to be deteriorated in transparency. Also, when the rubber phase contains particles having a particle size of less than 150 nm in an amount of more than 30% by weight, the obtained rubber-reinforced resin and its composition tend to be deteriorated in impact resistance, and when the rubber phase contains particles having a particle size of more than 350 nm in an amount of more than 30% by weight, the obtained rubber-reinforced resin and its composition tend to be deteriorated in transparency.

The average particle size and the particle size distribution of the butadiene-based rubber particles may be controlled by appropriately selecting kind and amount of emulsifier, kind and amount of polymerization initiator, and polymerization conditions such as polymerization time, polymerization temperature and stirring time. Alternatively, the average particle size and the particle size distribution may be controlled by blending two or more kinds of butadiene-based rubber particles which are different in average particle size and particle size distribution from each other.

The butadiene-based rubber content of the rubber-reinforced resin (A) is preferably 25 to 70% by weight, more preferably 30 to 60% by weight, especially preferably 40 to 50% by weight. When the butadiene-based rubber content of the rubber-reinforced resin (A) is too small, the obtained rubber-reinforced resin and its composition tend to be deteriorated in impact resistance. On the contrary, when the butadiene-based rubber content is too large, the obtained rubber-reinforced resin and its composition tend to be deteriorated in stiffness.

The rubber-reinforced resin (A) is produced by graft-polymerizing monomer components (b) containing as main components, an aromatic vinyl compound, a vinyl cyanide compound and an acrylic or methacrylic acid ester in the presence of particles of the above butadiene-based rubber (a).

As the aromatic vinyl compounds, there may be exemplified styrene and nucleus- and/or side chain-substituted styrene derivatives. Specific examples of the substituted styrene derivatives may include α-alkyl styrenes such as α-methyl styrene; nucleus-alkyl-substituted styrenes such as o-methyl styrene, m-methyl styrene, p-methyl styrene, p-t-butyl styrene, 2,4-dimethyl styrene and 3,5-dimethyl styrene; nucleus-halogen-substituted styrenes such as o-chlorostyrene, m-chlorostyrene, p-chlorostyrene, 2,4-dichlorostyrene and 3,5-didichlorostyrene; 1-vinyl naphthalene; or the like. Among these aromatic vinyl compounds, styrene, α-methyl styrene and p-methyl styrene are preferred, and styrene is more preferred. These aromatic vinyl compounds may be used singly or in the form of a mixture of any two or more thereof.

The content of the aromatic vinyl compound in the monomer components (b) is preferably 5 to 40% by weight, more preferably 10 to 30% by weight, especially preferably 15 to 25% by weight. When the content of the aromatic vinyl compound is too small, the obtained rubber-reinforced resin and its composition tends to be deteriorated in moldability. On the contrary, when the content of the aromatic vinyl compound is too large, the obtained rubber-reinforced resin and its composition tends to become insufficient in transparency.

Examples of the vinyl cyanide compounds may include acrylonitrile, methacrylonitrile and vinylidene cyanide. Among these vinyl cyanide compounds, acrylonitrile is preferred. These vinyl cyanide compounds may be used singly or in the form of a mixture of any two or more thereof.

The content of the vinyl cyanide compound in the monomer components (b) is preferably 1 to 30% by weight, more preferably 2 to 20% by weight, especially preferably 3 to 15% by weight. When the content of the vinyl cyanide compound is too small, the obtained rubber-reinforced resin and its composition tends to be deteriorated in impact resistance. On the contrary, when the content of the aromatic vinyl compound is too large, the obtained rubber-reinforced resin and its composition tends to be unsuitably colored and become insufficient in transparency.

Examples of the acrylic acid esters and methacrylic acid esters may include acrylates such as methyl acrylate, ethyl acrylate, n-propyl acrylate, i-propyl acrylate, n-butyl acrylate, i-butyl acrylate, sec-butyl acrylate, t-butyl acrylate, n-hexyl acrylate, n-octyl acrylate, 2-ethylhexyl acrylate, n-decyl acrylate, n-dodecyl acrylate, n-tetradecyl acrylate, n-hexadecyl acrylate, n-octadecyl acrylate, cyclohexyl acrylate, phenyl acrylate and benzyl acrylate; and methacrylates such as methyl methacrylate, ethyl methacrylate, n-propyl methacrylate, i-propyl methacrylate, n-butyl methacrylate, i-butyl methacrylate, sec-butyl methacrylate, t-butyl methacrylate, n-hexyl methacrylate, n-octyl methacrylate, 2-ethylhexyl methacrylate, n-decyl methacrylate, n-dodecyl methacrylate, n-tetradecyl methacrylate, n-hexadecyl methacrylate, n-octadecyl methacrylate, cyclohexyl methacrylate, phenyl methacrylate and benzyl methacrylate. Among these acrylic or methacrylic acid esters, methyl methacrylate is preferred. These acrylic and methacrylic acid esters may be used singly or in the form of a mixture of any two or more thereof.

The content of the acrylic or methacrylic acid ester in the monomer components (b) is preferably 50 to 90% by weight, more preferably 60 to 80% by weight, especially preferably 65 to 75% by weight. When the content of the acrylic or methacrylic acid ester is too small, the obtained rubber-reinforced resin and its composition tends to be deteriorated in transparency. On the contrary, when the content of the acrylic or methacrylic acid ester is too large, the obtained rubber-reinforced resin and its composition tends to be deteriorated in impact resistance.

In the present invention, polybutadiene, styrene, acrylonitrile and methyl methacrylate are preferably used in combination as the butadiene-based rubber, the aromatic vinyl compound, the vinyl cyanide compound and the acrylic or methacrylic acid ester, respectively.

Further, the monomer components (b) may contain other copolymerizable vinyl-based monomers unless the addition thereof adversely affects the aimed effects of the present invention. Examples of the other copolymerizable monomers may include unsaturated dicarboxylic acid anhydrides such as maleic anhydride, itaconic anhydride and citraconic anhydride; unsaturated carboxylic acids such as acrylic acid, methacrylic acid and crotonic acid; unsaturated imides such as maleimide, N-methyl maleimide, N-n-butyl maleimide, N-cylcohexyl maleimide, N-phenyl maleimide and N-(p-methylphenyl)maleimide; epoxy-containing unsaturated compounds such as glycidyl acrylate, glycidyl methacrylate and allyl glycidyl ether; unsaturated amides such as acrylamide and methacrylamide; amino-containing unsaturated compounds such as allyl amine, aminomethyl acrylate, dimethylaminomethyl acrylate, 2-aminoethyl acrylate, 2-dimethylaminoethyl acrylate, aminomethyl methacrylate, dimethylaminomethyl methacrylate, 2-aminoethyl methacrylate, 2-dimethylaminoethyl methacrylate and p-aminostyrene; hydroxy-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl acrylate, 2-hydroxyethyl methacrylate and p-hydroxystyrene; and oxazoline group-containing unsaturated compounds such as vinyl oxazoline. Among these other copolymerizable vinyl-based monomers, N-phenyl maleimide is preferred. These other copolymerizable vinyl-based monomers may be used singly or in the form of a mixture of any two or more thereof.

The rubber-reinforced resin (A) is produced by graft-polymerizing the monomer components (b) in the presence of particles of the butadiene-based rubber (a). The polymerization method is not particularly restricted as long as the average particle size and particle size distribution of the rubber phase in the obtained butadiene-based rubber-reinforced resin (A) lie within the above-specified ranges. The emulsion polymerization method is especially preferred. When the emulsion polymerization is used, the solid content of an emulsion prepared by emulsifying the butadiene-based rubber is preferably in the range of 20 to 70% by weight, more preferably 30 to 60% by weight from the standpoint of facilitated control of the average particle size and particle size distribution of the butadiene-based rubber particles to the above-specified ranges.

The intrinsic viscosity [η] of acetone solubles contained in the rubber-reinforced resin (A) is in the range of 0.2 to 0.4 dl/g, preferably 0.25 to 0.35 dl/g, more preferably 0.28 to 0.32 dl/g when measured at 30° C. in methyl ethyl ketone. When the intrinsic viscosity [η] of acetone solubles is less than 0.2 dl/g, the obtained rubber-reinforced resin and its composition may be deteriorated in impact resistance. When intrinsic viscosity [η] of acetone solubles is more than 0.4 dl/g, the obtained rubber-reinforced resin and its composition may be deteriorated in moldability. Here, the acetone solubles mean such a component obtained by adding a predetermined amount of the rubber-reinforced resin (A) into acetone, shaking the resultant mixture at ordinary temperature for 6 hours using a shaker, centrifuging the mixture for 60 minutes using a centrifugal separator operated at 23,000 rpm to remove solids therefrom, removing the acetone solvent from the separated liquid phase, and fully drying the resultant solids by a vacuum dryer. The intrinsic viscosity [η] of the acetone solubles may be readily controlled by varying kinds and amounts of butadiene-based rubber, monomer components, polymerization initiator, chain transfer agent and emulsifier, polymerization time and temperature, or the like.

The graft ratio of the rubber-reinforced resin (A) is preferably 40 to 150%, more preferably 45 to 100%, especially preferably 50 to 80%. When the graft ratio is too small, the obtained rubber-reinforced resin and its composition tend to be deteriorated in mechanical strength and transparency. On the contrary, when the graft ratio is too large, the obtained rubber-reinforced resin and its composition tend to be deteriorated in mechanical strength and moldability. Here, the graft ratio (%) means a percentage of the monomer components (b) grafted to the butadiene-based rubber (a). The graft ratio is calculated according to the following formula:

$$\text{Graft percentage } (\%) = [(y-x)/x] \times 100$$

wherein x is a weight of the butadiene-based rubber contained in acetone insolubles of the rubber-reinforced resin (A) which is obtained from a calibration curve previously prepared, for example, using the absorbance ratio of a trans-double bond out-of-plane C-H bending vibration at 967 cm$^{-1}$ by infrared spectroscopic analysis when the butadiene-based rubber is polybutadiene; and y is a weight of the acetone insolubles.

Here, the acetone insolubles mean such a component obtained by adding 1 g of the rubber-reinforced resin (A) into 50 ml of acetone, shaking the resultant mixture at room temperature for 24 hours using a shaker, centrifuging the I, mixture for 60 minutes using a centrifugal separator operated at 23,000 rpm, and fully drying the obtained solids by a vacuum dryer. The graft ratio of the rubber-reinforced resin (A) may be readily controlled by varying kinds and amounts of butadiene-based rubber, monomer components, polymerization initiator, chain transfer agent and emulsifier, polymerization time and temperature, or the like.

Polybutadiene usually has a refractive index of 1.514 to 1.520. Therefore, when polybutadiene is used as the butadiene-based rubber, the refractive index of the acetone solubles of the rubber-reinforced resin (A) is preferably 1.514 to 1.520, more preferably 1.515 to 1.519, especially preferably 1.516 to 1.518. When the refractive index of the acetone solubles is out of the above-specified range, the obtained rubber-reinforced resin and its composition tend to be deteriorated in transparency. The refractive index of the acetone solubles may be controlled by varying structure of the butadiene-based rubber, composition of the monomer components or the like. Further, in the present invention, the difference in refractive index between acetone insolubles and acetone solubles of the rubber-reinforced resin (A) is preferably not more than 0.006.

The haze of the rubber-reinforced resin (A) is preferably not more than 10%, more preferably not more than 7%, especially preferably not more than 5%. The lower the haze of the rubber-reinforced resin (A), the higher the transparency thereof.

Next, the transparent butadiene-based rubber-reinforced resin composition [I] according to the third aspect of the present invention will be explained below. The rubber-reinforced resin composition [I] of the present invention comprises the above rubber-reinforced resin (A); and a thermoplastic resin composed mainly of a copolymer (B) having an intrinsic viscosity [η] of 0.2 to 0.4 dl/g which is produced by copolymerizing with the monomer components containing as main components an aromatic vinyl compound, a vinyl cyanide compound and an acrylic or methacrylic acid ester. The rubber-reinforced resin composition [I] contains the butadiene-based rubber in an amount of 3 to 30% by weight based on the total weight of the composition.

Conventional transparent ABS resins are rubber-reinforced resins produced by graft-polymerizing methyl methacrylate (MMA), styrene (ST) and acrylonitrile (AN) in the presence of polybutadiene. The MMA/ST/AN tercopolymer obtained by the graft polymerization exhibits a refractive index close to that of polybutadiene. However, the conventional transparent ABS resins are incapable of satisfying both transparency and physical properties in a well-balanced manner. This is because when the graft polymerization percentage is increased, the compositional distribution of MMA, ST and AN in the monomer components becomes broad, so that the distribution of refractive index of the obtained tercopolymer as a matrix resin also becomes widened. On the other hand, in the present invention, the rubber-reinforced resin containing a relatively large amount of rubber components (e.g., 25 to 70% by weight), is blended with the copolymer (B) having a narrow refractive index distribution. As a result, it is possible to stably produce a resin composition capable of satisfying both transparency and physical properties in a well-balanced manner.

The aromatic vinyl compound, vinyl cyanide compound and acrylic or methacrylic acid ester used for the production of the copolymer (B) of the rubber-reinforced resin composition [I] may be the same as those used for the above rubber-reinforced resin (A). Also, the copolymer (B) may contain the same other copolymerizable vinyl-based monomers as exemplified for the monomer components (b) of the rubber-reinforced resin (A) as long as the effects of the present invention are still achievable. As the monomers for the production of the copolymer (B), styrene, acrylonitrile and methyl methacrylate are preferably used in combination.

The mixing ratio between the aromatic vinyl compound, vinyl cyanide compound and acrylic or methacrylic acid ester which are used to produce the copolymer (B), is preferably 5 to 40:1 to 30:50 to 90, more preferably 10 to 30:2 to 20:60 to 80, especially preferably 15 to 25:3 to 15:65 to 75 with the proviso that the total amount thereof is 100% by weight. When the mixing ratio between the respective monomers copolymerized lies within the above-specified range, it is possible to obtain the rubber-reinforced resin composition [I] having excellent transparency and mechanical properties.

The intrinsic viscosity [η] of the copolymer (B) is usually 0.2 to 0.4 dl/g, preferably 0.25 to 0.35 dl/g, more preferably 0.28 to 0.32 dl/g when measured at 30° C. in methyl ethyl ketone. When the intrinsic viscosity [η] of the copolymer (B) is less than 0.2 dl/g, the obtained rubber-reinforced resin composition tends to be deteriorated in impact resistance. When the intrinsic viscosity [η] of the copolymer (B) is more than 0.4 dl/g, the obtained rubber-reinforced resin composition tends to be deteriorated in moldability. The intrinsic viscosity [η] of the copolymer (B) can be readily controlled by varying kinds and amounts of monomer components, polymerization initiator, chain transfer agent and emulsifier, polymerization time and temperature, or the like.

The content of the butadiene-based rubber in the rubber-reinforced resin composition [I] is 3 to 30% by weight, preferably 5 to 25% by weight, more preferably 10 to 20% by weight. When the content of the butadiene-based rubber is less than 3% by weight, the obtained rubber-reinforced resin composition may be deteriorated in mechanical strength. When the content of the butadiene-based rubber is more than 30% by weight, the obtained rubber-reinforced resin composition may be deteriorated in scuff or scratch resistance.

When polybutadiene is used as the butadiene-based rubber, the acetone solubles of the obtained rubber-reinforced resin composition [I] preferably has a refractive index of 1.514 to 1.520, more preferably 1.515 to 1.519, especially preferably 1.516 to 1.518 similarly to that of the acetone solubles of the rubber-reinforced resin (A). The refractive index of the acetone solubles of the rubber-reinforced resin composition [I] may be controlled by varying the monomer composition or the like.

The difference in refractive index between the acetone insolubles of the rubber-reinforced resin (A) and the copolymer (B) is preferably not more than 0.006, more preferably not more than 0.005, especially preferably not more than 0.004. When the refractive index difference is too large, the obtained rubber-reinforced resin composition tends to be deteriorated in transparency.

The polymerization conversion percentage upon the production of the copolymer (B) is preferably not more than 80% by weight, more preferably not more than 70% by weight. When the polymerization conversion percentage is too high, the compositional distribution of the monomer components becomes broad, so that the distribution of refractive index of the obtained copolymer also becomes broad, resulting in deteriorated transparency of the obtained rubber-reinforced resin composition. In order to appropriately control the polymerization conversion percentage, the copolymer (B) is preferably produced by the method capable of immediately stopping the polymerization and readily recovering the monomer components, such as bulk polymerization and solution polymerization. If emulsion polymerization is used, it is required to use an emulsifier and a polymerization promoter which tend to adversely affect the transparency of the obtained resin composition. In order to avoid such a problem, the use of bulk polymerization or solution polymerization is preferred.

The mixing ratio between the rubber-reinforced resin (A) and the copolymer (B) contained in the rubber-reinforced resin composition [I] is preferably 10 to 90:90 to 10, more preferably 20 to 80:80 to 20, especially preferably 30 to 70:70 to 30 with the proviso that the total amount of (A) and (B) is 100% by weight. When the content of the rubber-reinforced resin (A) is too small, the obtained rubber-reinforced resin composition tends to be deteriorated in impact resistance. When the content of the rubber-reinforced resin (A) is too large, the obtained rubber-reinforced resin composition tends to be deteriorated in moldability and transparency.

The haze of the rubber-reinforced resin composition [I] is preferably not more than 10%, more preferably not more than 7%, especially preferably not more than 5% similarly to that of the rubber-reinforced resin (A).

Next, the rubber-reinforced resin composition [II] for laser marking according to the fourth aspect of the present invention is explained below. The rubber-reinforced resin composition [II] for laser marking comprises 30 to 100 parts by weight of the rubber-reinforced resin (A) and 70 to 0 parts by weight of a thermoplastic resin (C) other than the rubber-reinforced resin (A) with the proviso that the total amount of (A) and (C) is 100% by weight, and exhibits a good laser marking property, i.e., an excellent white tinting property by laser marking.

Examples of the thermoplastic resin (C) may include in addition to similar resins to the copolymer (B) used in the above rubber-reinforced resin composition [I], acrylonitrile/butadiene-based rubber/styrene (ABS) resins, acrylonitrile/styrene (AS) resins, methyl methacrylate/butadiene-based rubber/styrene (MBS) resins, acrylonitrile/ethylene-propylene-based rubber/styrene (AES) resins, acrylonitrile/styrene/acrylic rubber (ASA) resins, acrylic resins or the like. Among these thermoplastic resins, the copolymer(B) and a mixture of the copolymer (B) and the other thermoplastic resin are preferred in view of well-balanced transparency and physical properties of the obtained composition.

The mixing ratio between the rubber-reinforced resin (A) and the thermoplastic resin (C) contained in the rubber-reinforced resin composition [II] is 30 to 100 (wt. parts):70 to 0 (wt. parts), preferably 40 to 100 (wt. parts):60 to 0 (wt. parts), more preferably 50 to 100 (wt. parts):50 to 0 (wt. parts) with the proviso that the total amount of (A) and (C) is 100% by weight. When the content of the rubber-reinforced resin (A) is less than 30 parts by weight, the obtained composition may be deteriorated in white tinting property by laser marking.

The rubber-reinforced resin composition [II] of the present invention has an extremely excellent white tinting property, i.e., a good printability by laser marking unlike the conventional materials. The reason therefor is that components derived from the acrylic or methacrylic acid ester contained in the rubber-reinforced resin (A) or the copolymer (B) contribute to the white tinting property. Therefore, the total content of components derived from the acrylic or methacrylic acid ester contained in the rubber-reinforced resin composition [II], is preferably 30 to 80% by weight, more preferably 40 to 70% by weight.

The rubber-reinforced resin (A), the rubber-reinforced resin composition [I] and the rubber-reinforced resin composition [II] of the present invention may further contain various additives such as fluorescent brightening agents, metal deactivators, bluing agents, coupling agents, weather-proofing (light-resisting) agents, antioxidants, plasticizers, colorants, lubricants, anti-static agents, silicone oil, foaming agents, fillers, flame retardants and flame-retarding assistants. Among these additives, the use of at least one additive selected from the group consisting of fluorescent brightening agents, metal deactivators and bluing agents is preferred.

Examples of the fluorescent brightening agents may include 2,5-bis[5'-t-butylbenzoxazolyl(2)]thiophene or the like. Examples of the metal deactivators may include N,N'-bis[3-(3,5-di-t-butyl-4-hydroxyphenyl)propionyl]hydrazine, benzotriazole, methyl benzotriazole, potassium salt of methyl benzotriazole or the like. Examples of the bluing agents may include anthraquinone-based compounds or the like. The total amount of these additives added is preferably 0.00001 to 0.5 part by weight based on 100 parts by weight of the rubber-reinforced resin (A) or the respective rubber-reinforced resin compositions [I] and [II].

Further, the rubber-reinforced resin (A) and the respective rubber-reinforced resin compositions [I] and [II] may contain, if required, other polymers or copolymers. Examples of the other polymers or copolymers may include polypropylene, polyamides, polyesters, polycarbonates, polysulfones, polyether sulfones, polyphenylene sulfides, liquid crystal polymers, polyvinylidene fluoride, polytetrafluoroethylene, polyamide elastomers, polyamide imide elastomers, polyester elastomers, polyether ester amides, phenol resins, epoxy resins, novolak resins, resol resins or the like. These other polymers or copolymers may be used singly or in the form of a mixture of any two or more thereof. The total amount of the other polymers or copolymers added is not particularly restricted as long as the aimed effects of the present invention are still achievable.

The rubber-reinforced resin (A) and the respective rubber-reinforced resin compositions [I] and [II] according to the present invention may be kneaded using various extruders such as vented extruder, Banbury mixer, kneader or roll, and then formed into pellets. The kneading is preferably performed using the vented extruder. When kneaded by the vented extruder, the cylinder temperature is preferably set to 180 to 230° C., and the respective components to be kneaded may be added either in batch or in multiple stages The thus obtained pellets may be formed into various products by injection molding, sheet-extrusion molding, vacuum molding, profile extrusion molding, blow molding, foam molding, injection pressing, gas-injection molding or the like. Examples of the molded products may include various parts, chassises and housings used in various applications such as office automation (OA) devices, domestic electric appliances, electric or electronic devices, sundries, sanitary products and vehicles.

Thus, the rubber-reinforced resin (A) and the rubber-reinforced resin composition [I] according to the present invention are excellent in impact resistance, moldability, transparency and white tinting property by laser marking, and the molded products obtained therefrom may be used as various parts, chassises and housings in various applications such as office automation (OA) devices, domestic electric appliances, electric or electronic devices, sundries, sanitary products and vehicles. Also, the rubber-reinforced resin composition [II] according to the present invention has excellent properties similar to those of the rubber-reinforced resin composition [I], or contains the rubber-reinforced resin (A) exhibiting excellent impact resistance, moldability, transparency and white tinting property by laser marking. Therefore, the resin composition [II] can be suitably used as laser marking materials in various applications such as office automation (OA) devices, domestic electric appliances, electric or electronic devices, sundries, sanitary products and vehicles.

EXAMPLES

The present invention will hereinafter be described in further detail by showing the examples thereof, but it is to be understood that the present invention is not limited in its scope by these examples. In the following Examples and Comparative Examples, all "parts" and "%" are by weight unless otherwise noted.

(1) Average particle size and particle size distribution of polybutadiene rubber latex:

The latex was diluted with pure water, and the resultant aqueous dispersion was analyzed by dynamic light scattering method to measure the average particle, content of particles having a particle size of less than 150 nm, and content of particles having a particle size of more than 350 nm.

(2) Gel fraction:

The gel fraction was measured by the method as described above in the present specification.

(3) Graft percentage:

The graft ratio was also measured by the method as described above in the present specification.

(4) Intrinsic viscosity [η]:

Acetone solubles were dissolved in methyl ethyl ketone to prepare five solutions having different concentrations. The reduced viscosities of the respective five solutions were measured at 30° C. by Ubbellode viscometer to determine the intrinsic viscosities [η].

(5) Average particle size and particle size distribution of rubber phase in rubber-reinforced resin:

The rubber-reinforced resin was sliced into pieces each having a thickness of 80 to 120 nm using a microtome. The obtained pieces were stained with osmium tetraoxide and observed by a transmission electron microscope. The microphotograph was subjected to image analysis to determine the average particle, content of particles having a particle size of less than 150 nm and content of particles having a particle size of more than 350 nm, of a rubber phase contained in the resin. Meanwhile, the thickness of 80 to 120 nm corresponds to such a region where the sliced pieces exhibit a silver- to gold-color on a display of the transmission electron microscope.

(6) Izod (IZ) impact strength:

A notched test specimen of 50.0 mm×12.8 mm×6.6 mm according to JIS K7110 was used to measure the Izod impact strength (unit: kgf·cm/cm) thereof.

(7) Moldability (melt flow rate):

The melt flow rate (unit: g/10 min.) was measured at 240° C. under a load of 10 kg according to JIS K7210.

(8) bL value:

The degree of discoloration Lab (L: lightness; a: redness; b: yellowness) was measured by a multi-light source spectrographic colorimeter manufactured by Suga Testing Machines Manufacturing Co., Ltd. The bL value (color change value) was calculated from the following formula:

$$bL = \sqrt{[(L_1 - L_2)^2 + (a_1 - a_2)^2 + (b_1 - b_2)^2]}$$

wherein $L_1$, $a_1$ and $b_1$ are values of a standard specimen; and $L_2$, $a_2$ and $b_2$ are values of the test specimen.

The smaller bL value indicates a less color change and a more excellent color stability.

(9) Laser marking property:

The surface of a plate-shaped injection-molded product (2.4 mm×5 cm×8cm) was laser-marked by a laser marker (Star Mark) 65W using YAG laser, mfd. by Carl Baasel Co., Ltd., and its portions tinted by the laser irradiation were visually observed to evaluate a tinting property, visibility and clearness according to the following evaluation criteria:

A: Excellent: Tinted images with higher clearness and visibility

B: Good: Tinted images with reasonable clearness and visibility

C: Not poor: Tinted images deteriorated in either clearness or visibility

D: Poor: Tinted images deteriorated in both clearness and visibility

Example 1: Preparation and evaluation of rubber-reinforced resin (A)

A 10 liter separable flask equipped with a stirrer was charged with 30 parts (solid content) of the polybutadiene latex (a-1) shown in Table 1, and then with 0.5 part of potassium oleate, 0.2 part of glucose, 0.2 part of sodium pyrophosphate, 0.01 part of ferrous sulfate and 100 parts of deionized water. The mixture was heated to 70° C. while stirring, and then sequentially mixed with 49 parts of methyl methacrylate, 16 parts of styrene, 5 parts of acrylonitrile, 0.4 part of diisopropylbenzenehydroperoxide and 0.8 part of t-dodecyl mercaptan for 5 hours to conduct the polymerization therebetween, thereby obtaining a rubber-reinforced resin (A-1). Upon completion of the polymerization, the polymerization conversion percentage was 98%. The obtained rubber-reinforced resin (A-1) was melt-kneaded at 200° C. by a single-screw extruder, and then injection-molded to prepare a test specimen. The evaluation results of the test specimen are shown in Table 3.

Synthesis Example 1: Production of copolymer (B)

A 10 liter autoclave was charged with 73 parts of methyl methacrylate, 20 parts of styrene, 7 parts of acrylonitrile, 20 parts of toluene and 0.5 part of t-dodecyl mercaptan. The resultant mixture was polymerized at 150° C. for 5 hours, thereby obtaining a copolymer (B-1). Upon completion of the polymerization, the polymerization conversion percentage was 70%. The properties of the obtained copolymer (B-1) are shown in Table 2.

Example 2: Preparation and evaluation of rubber-reinforced resin composition [I]

Fifty parts of the rubber-reinforced resin (A-1) obtained in Example 1 and 50 parts of the copolymer (B-1) obtained in Synthesis Example 1 were melt-kneaded at 200° C. using a single-screw extruder, and then injection-molded to prepare a test specimen. The evaluation results of the test specimen are shown in Table 3.

Examples 3 to 5:

A rubber-reinforced resin (A-2 to A-4) produced by the same method as in Example 1 except for using polybutadiene latex (a-2 to a-4) and monomer components as shown in Table 1, and a copolymer (B-2 to B-4) produced by the same method as in Synthesis Example 1 except for using monomer components as shown in Table 2, were melt-kneaded at 200° C. and at a mixing ratio as shown in Table 3 using a single-screw extruder, and then injection-molded to prepare a test specimen. The evaluation results of the test specimen are shown in Table 3.

Comparative Examples 1 to 2:

A rubber-reinforced resin (β-1 to β-2) produced by the same method as in Example 1 except for using polybutadiene latex (α-1 to α-2) and monomer components as shown in Table 1, and a copolymer (B-1 to B-2) produced by the same method as in Synthesis Example 1 except for using monomer components as shown in Table 2, were melt-kneaded at 200° C. and at a mixing ratio as shown in Table 3 using a single-screw extruder, and then injection-molded to prepare a test specimen. The evaluation results of the test specimen are shown in Table 3.

As apparent from Table 3, the rubber-reinforced resins (A) and the rubber-reinforced resin compositions [I] were excellent in impact resistance, moldability, transparency and white tinting property by laser marking.

TABLE 1

|  | Example 1 | Example 2 | Example 3 | Example 4 | Example 5 | Com. Ex. 1 | Com. Ex. 2 |
| --- | --- | --- | --- | --- | --- | --- | --- |
| Polybutadiene latex | a-1 | a-1 | a-2 | a-3 | a-4 | α-1 | α-2 |
| Average particle size (nm) | 250 | 250 | 200 | 230 | 180 | 400 | 250 |
| Particle size[*1] < 150 nm (%) | 15 | 15 | 22 | 15 | 28 | 20 | 40 |
| Particle size[*2] > 350 nm (%) | 15 | 15 | 23 | 15 | 8 | 20 | 40 |
| Gel fraction (%) | 90 | 90 | 85 | 90 | 90 | 90 | 90 |
| Refractive index | 1.517 | 1.517 | 1.517 | 1.517 | 1.517 | 1.517 | 1.517 |
| Solid content (%) | 50 | 50 | 50 | 50 | 50 | 50 | 50 |
| Rubber-reinforced resin | A-1 | A-1 | A-2 | A-3 | A-4 | β-1 | β-2 |
| (a) Content (%) | 30 | 30 | 50 | 50 | 60 | 30 | 30 |
| Monomer components |  |  |  |  |  |  |  |
| Methyl methacrylate (part) | 49 | 49 | 35 | 35 | 28 | 49 | 49 |
| Styrene (part) | 16 | 16 | 11.5 | 11.5 | 9 | 16 | 16 |
| Acrylonitrile (part) | 5 | 5 | 3.5 | 3.5 | 3 | 5 | 5 |
| Graft percentage | 60 | 60 | 50 | 55 | 45 | 60 | 60 |
| Acetone solubles |  |  |  |  |  |  |  |
| Intrinsic viscosity (dl/g) | 0.25 | 0.25 | 0.23 | 0.25 | 0.24 | 0.25 | 0.25 |
| Refractive index | 1.517 | 1.517 | 1.518 | 1.516 | 1.517 | 1.517 | 1.517 |
| Refractive index of acetone insolubles | 1.517 | 1.517 | 1.517 | 1.516 | 1.517 | 1.517 | 1.517 |
| Rubber phase |  |  |  |  |  |  |  |
| Average particle size (nm) | 260 | 260 | 220 | 250 | 190 | 420 | 260 |
| Particle size[*1] < 150 nm (%) | 10 | 10 | 21 | 14 | 27 | 19 | 38 |
| Particle size[*2] > 350 nm (%) | 18 | 18 | 24 | 16 | 10 | 21 | 45 |

Note:
[*1]Content of particles having a particle size of less than 150 nm; and
[*2]Content of particles having a particle size of more than 350 nm.

TABLE 2

|  | Example 1 | Example 2 | Example 3 | Example 4 | Example 5 | Com. Ex. 1 | Com. Ex. 2 |
| --- | --- | --- | --- | --- | --- | --- | --- |
| Copolymer (B) | — | B-1 | B-2 | B-3 | B-4 | B-1 | B-1 |
| Monomer components |  |  |  |  |  |  |  |
| Methyl methacrylate (part) | — | 73 | 74 | 72 | 76 | 73 | 73 |
| Styrene (part) | — | 20 | 19 | 21 | 17 | 20 | 20 |
| Acrylonitrile (part) | — | 7 | 7 | 7 | 7 | 7 | 7 |

TABLE 2-continued

|  | Example 1 | Example 2 | Example 3 | Example 4 | Example 5 | Com. Ex. 1 | Com. Ex. 2 |
|---|---|---|---|---|---|---|---|
| Intrinsic viscosity (dl/g) | — | 0.32 | 0.38 | 0.35 | 0.28 | 0.32 | 0.32 |
| Refractive index | — | 1.518 | 1.517 | 1.519 | 1.516 | 1.518 | 1.518 |

TABLE 3

|  | Example 1 | Example 2 | Example 3 | Example 4 | Example 5 | Com. Ex. 1 | Com. Ex. 2 |
|---|---|---|---|---|---|---|---|
| Rubber-reinforced resin |  |  |  |  |  |  |  |
| Kind | A-1 | A-1 | A-2 | A-3 | A-4 | β-1 | β-2 |
| Content (%) | 100 | 50 | 40 | 20 | 30 | 50 | 50 |
| Copolymer (B) |  |  |  |  |  |  |  |
| Kind | — | B-1 | B-2 | B-3 | B-4 | B-1 | B-1 |
| Content (%) | 0 | 50 | 60 | 80 | 70 | 50 | 50 |
| Content of polybutadiene rubber (%) | 30 | 15 | 20 | 10 | 18 | 15 | 15 |
| Difference in refractive index*3 | — | 0.001 | 0.001 | 0.003 | 0.001 | 0.001 | 0.001 |
| Properties |  |  |  |  |  |  |  |
| IZ impact strength (kgf · cm/cm) | 25 | 25 | 24 | 20 | 25 | 20 | 21 |
| Melt flow rate (g/10 min.) | 8 | 15 | 13 | 20 | 18 | 16 | 15 |
| Haze (%) | 3 | 2 | 3 | 4 | 3 | 7 | 10 |
| bL value | 3 | 2 | 2 | 2 | 2 | 4 | 5 |
| Laser marking property | A | A | A | A | A | C | D |

Note:
*3Difference in refractive index between acetone insolubles contained in the transparent butadiene-based rubber-reinforced resin (A) and the copolymer (B).

What is claimed is:

1. A transparent butadiene-based rubber-reinforced resin produced by graft-polymerizing monomer components (b) comprising as main components an aromatic vinyl compound, a vinyl cyanide compound and an acrylic or methacrylic acid ester in the presence of particles of a butadiene-based rubber (a), said butadiene-based rubber-reinforced resin comprising, when observed by an electron microscope, a rubber phase having an average particle size of 150 to 350 nm and containing particles having a particle size of less than 150 nm in an amount of not more than 30% by weight and particles having a particle size of more than 350 nm in an amount of not more than 30% by weight; and said butadiene-based rubber-reinforced resin containing acetone solubles having an intrinsic viscosity [η] of 0.2 to 0.4 dl/g when measured at 30° C. in methyl ethyl ketone.

2. A transparent butadiene-based rubber-reinforced resin according to claim 1, wherein said butadiene-based rubber (a) is polybutadiene, and said butadiene-based rubber-reinforced resin contains acetone solubles having a refractive index of 1.514 to 1.520 when measured at 25° C. using D line.

3. A transparent butadiene-based rubber-reinforced resin according to claim 1, wherein the difference in refractive index between acetone insolubles and acetone solubles contained in said transparent butadiene-based rubber-reinforced resin is not more than 0.006.

4. A transparent butadiene-based rubber-reinforced resin composition, comprising:
the transparent butadiene-based rubber-reinforced resin (A) as defined in claim 1; and
a thermoplastic resin made of a copolymer (B) which is produced by copolymerizing an aromatic vinyl compound, a vinyl cyanide compound and an acrylic or methacrylic acid ester, and said copolymer (B) has an intrinsic viscosity [η] of 0.2 to 0.4 dl/g when measured at 30° C. in methyl ethyl ketone, said transparent butadiene-based rubber-reinforced resin (A) being contained in an amount of 3 to 30% by weight based on the total weight of the composition.

5. A transparent butadiene-based rubber-reinforced resin composition according to claim 4, wherein the butadiene-based rubber used in said transparent butadiene-based rubber-reinforced resin (A) is polybutadiene, and said butadiene-based rubber-reinforced resin composition contains acetone solubles having a refractive index of 1.514 to 1.520 when measured at 25° C. using D line.

6. A transparent butadiene-based rubber-reinforced resin composition according to claim 4, wherein the difference in refractive index between acetone insolubles contained in said transparent butadiene-based rubber-reinforced resin (A) and said copolymer (B) is not more than 0.006.

7. A transparent butadiene-based rubber-reinforced resin ion according to claim 4, wherein said transparent butadiene-based rubber-reinforced resin (A) is produced by emulsion polymerization, and said copolymer (B) is produced by bulk polymerization or solution polymerization.

8. A butadiene-based rubber-reinforced resin composition for laser marking, comprising:
30 to 100 parts by weight of the transparent butadiene-based rubber-reinforced resin (A) according to claim 1; and
70 to 0 parts by weight of a thermoplastic resin (C) other than said the transparent butadiene-based rubber-reinforced resin (A), with the proviso that the total amount of (A) and (C) is 100% by weight.

9. A butadiene-based rubber-reinforced resin composition for laser marking according to claim 8, having a white tinting property.

10. A transparent butadiene-based rubber-reinforced resin according to claim 1, wherein the rubber phase has an average particle size of 170 to 320 nm.

11. A transparent butadiene-based rubber-reinforced resin according to claim 1, wherein the rubber phase has an average particle size of 200 to 300 nm.

12. A transparent butadiene-based rubber-reinforced resin according to claim 1, wherein the rubber phase contains particles having a particle size of less than 150 nm in an amount of not more than 25% by weight and particles having a particle size of more than 350 nm in an amount of not more than 25% by weight.

13. A transparent butadiene-based rubber-reinforced resin according to claim 1, wherein the rubber phase contains particles having a particle size of less than 150 nm in an amount of not more than 20% by weight and particles having a particle size of more than 350 nm in an amount of not more than 20% by weight.

* * * * *